United States Patent [19]

Jarboe

[11] 4,335,702
[45] Jun. 22, 1982

[54] WOODBURNING STOVE

[76] Inventor: Joseph E. Jarboe, Rte. 3, Box 70, Hardinsburg, Ky. 40143

[21] Appl. No.: 68,622

[22] Filed: Aug. 22, 1979

[51] Int. Cl.³ ............................ F24B 5/00; F24C 1/14
[52] U.S. Cl. .................................... 126/15 R; 126/77; 126/163 R
[58] Field of Search ................... 126/77, 15 R, 15 A, 126/112, 163 R, 163 A, 4, 3, 152 R, 152 B

[56] References Cited

U.S. PATENT DOCUMENTS

| | | | |
|---|---|---|---|
| 83,657 | 11/1868 | Pease | 126/15 R |
| 97,066 | 11/1869 | Eaton | 126/15 R |
| 102,533 | 5/1870 | Giles | 126/15 R |
| 395,430 | 1/1889 | Emerson | 126/77 |
| 894,432 | 7/1908 | Grundy | 126/15 R |
| 900,821 | 10/1908 | Berry | 126/15 R |
| 1,098,798 | 6/1914 | Hickey | 126/15 R |
| 1,127,254 | 2/1915 | James | 126/15 R |
| 1,153,333 | 9/1915 | O'Neill | 126/15 R |
| 1,169,119 | 1/1916 | Brewer | 126/15 R |
| 1,172,128 | 2/1916 | Frost | 126/15 R |
| 1,172,129 | 2/1916 | Frost | 126/15 R |
| 1,475,587 | 11/1923 | Leonard | 126/15 R |
| 1,669,852 | 6/1927 | Britton | 126/15 R |
| 2,781,039 | 2/1957 | Kaiser et al. | 126/77 |
| 3,649,211 | 3/1972 | Vosper | 431/171 |
| 4,078,541 | 3/1978 | Roycraft | 126/99 R |
| 4,111,181 | 9/1978 | Canney | 126/77 |
| 4,177,791 | 12/1979 | Merchant | 126/77 |

Primary Examiner—Daniel J. O'Connor
Attorney, Agent, or Firm—Woodard, Weikart, Emhardt & Naughton

[57] ABSTRACT

An efficient, clean burning, woodburning stove in which super heated fresh air and exhaust gases from the primary combustion of the wood fire are introduced into a secondary combustion chamber wherein these gases are mixed to recombust remaining fuel particles. Exhaust from the secondary combustion chamber enters a heat exchange chamber wherein the heat content of the exhaust gas is transferred to the cooking surface of the stove. The burning rate of both the primary and secondary combustion can be independently controlled by individually selecting the air supplies to the combustion areas. An inclined grate, in combination with the direction of the exhaust gases, provides a self feeding feature in which an even burning rate of the fire is insured.

7 Claims, 8 Drawing Figures

FIG. IC

WOODBURNING STOVE

BACKGROUND OF THE INVENTION

1. Field of the Invention

The field of the invention is woodburning stoves. More particularly the field of the invention is those woodburning stoves which include means for increasing the efficiency of combustion of the wood fuel and transferring heat energy to the heating and cooking surfaces of the stove.

2. Description of the Prior Art

In the past, woodburning stoves were the primary means of heating and cooking in the home. For reasons of convenience, however, woodburning stoves have been replaced by electric stoves and gas ranges. In recent years, woodburning stoves have had a return in popularity, particularly in rural areas where the relative cost of wood is inexpensive compared to the alternative energy sources.

It is, of course, desirable for any stove to operate efficiently. The advantages of fuel efficiency become even more apparent in the context of woodburning stoves, because of the relative inconvenience in having to supply wood to the fire, and because incomplete combustion of a wood fire produces undesirable smoke and soot which is discharged through the exhaust duct of the stove.

The particular advantages involved in the clean burning wood stove are (1) fuel economy, (2) added convenience in having to bring less wood to the fire and in having to tend the fire less often, (3) cleaner exhaust fumes and thus less air polution and (4) to the extent that complete combustion can be controlled, the temperature of the heating and cooking surfaces can also be controlled.

In U.S. Pat. No. 239,517 to Leiter is disclosed a device which aids in more complete combustion in a stove. The Leiter device is an open ended box which fits into the passageway leading to the exhaust duct. As smoke and exhaust gas are forced through perforations in the box, the gases are reheated causing more complete combustion. The Leiter device does not provide a fresh air supply to aid in recombustion.

In U.S. Pat. Nos. 1,172,128 and 1,172,129 to Frost is disclosed the introduction of fresh air through a pipe to discharge above the combustion area in order to provide additional combustion of the fuel particles contained within the exhaust gas. In U.S. Pat. No. 1,153,333 to O'Neill is disclosed a device in which heated air is introduced into the combustion chamber after having been brought through orifices in the cooking surface. In U.S. Pat. No. 1,169,119 to Brewer is disclosed a heating system in which heated air is discharged to both above and below the grate in the combustion area.

U.S. Pat. No. 3,649,211 to Vosper and U.S. Pat. No. 4,078,541 to Roycraft are two modern patents which disclose the injection of secondary air to accomplish secondary combustion of unburned fuel particles. The Vosper patent discloses the injection of air into the exhaust duct of an incinerator. The Roycraft patent discloses a heating furnace that operates on either oil or wood fuel. Pre-heated secondary air is injected to accomplish secondary combustion of the wood particles.

SUMMARY OF THE INVENTION

In general terms, the present invention is a new and useful woodburning stove which provides for efficient combustion. Both super heated fresh air and exhaust gas from the primary combustion area are introduced into a secondary combustion chamber wherein these gases are mixed to recombust remaining fuel particles contained within the gas. Exhaust from the secondary combustion chamber enters a heat exchange chamber wherein the heat content of the exhaust gas is transfered to the heating and cooking surfaces of the stove. The result is an efficient, clean burning stove. In certain embodiments of the present invention are incorporated means to control the burning rate of the wood fuel, and the rate of secondary combustion in the secondary combustion chamber.

BRIEF DESCRIPTION OF THE DRAWINGS

FIG. 1C is a top plan fragmentary view of the woodburning stove of FIG. 1A.

DESCRIPTION OF THE PREFERRED EMBODIMENTS

Figure 1A:
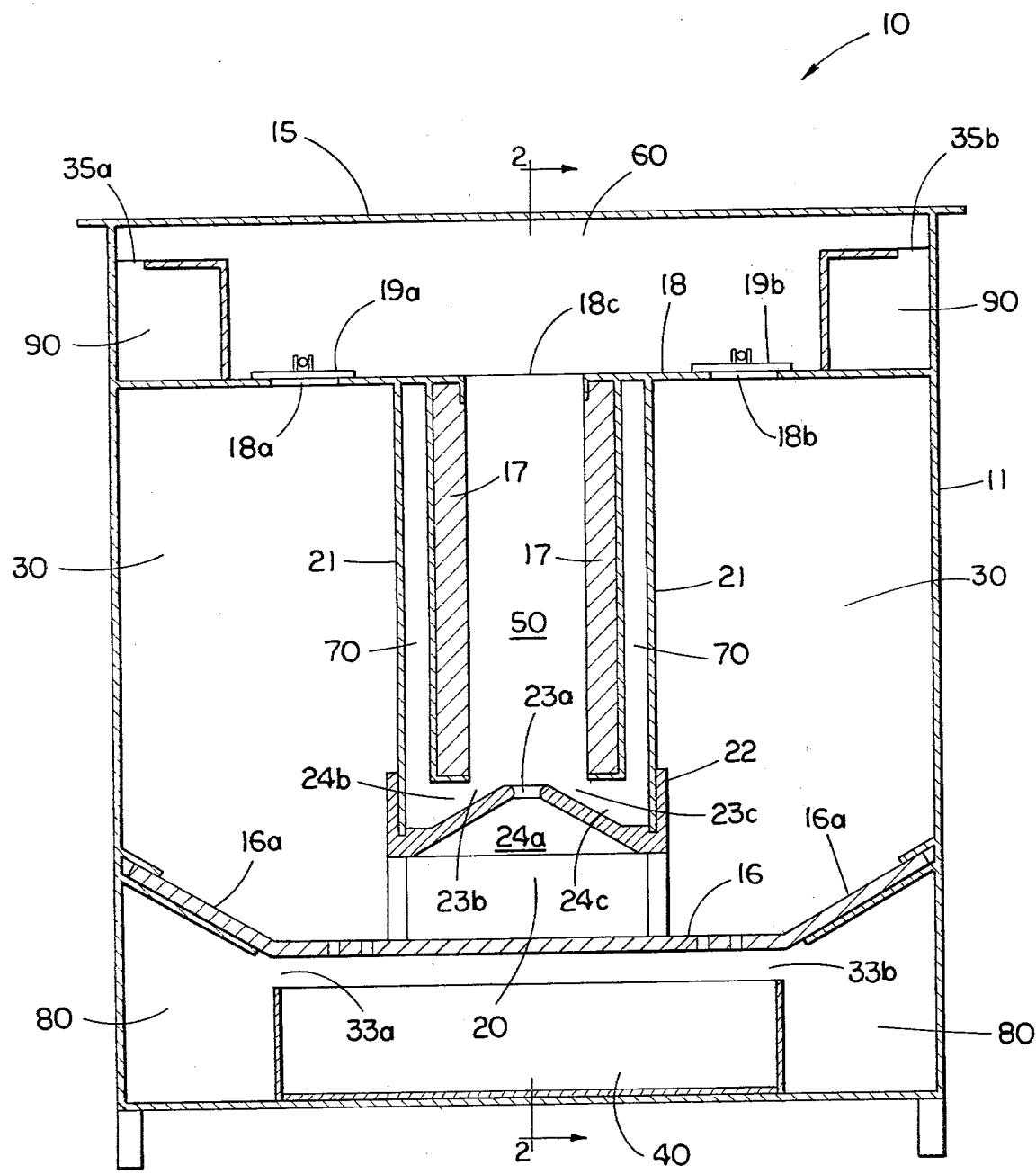
FIG. 1A is a front elevation sectional view of a woodburning stove of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
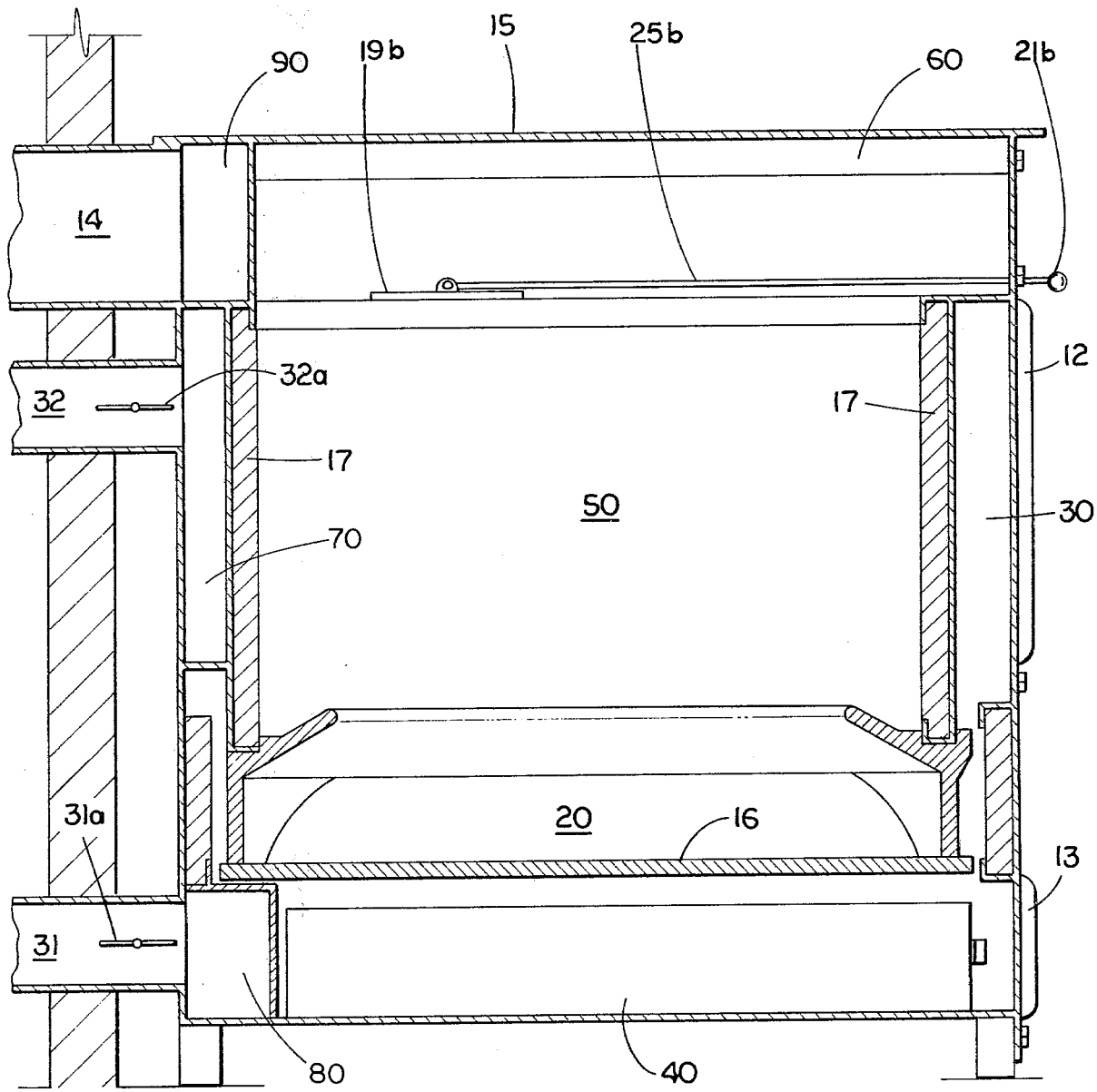
FIG. 1B is a side elevation sectional view of the woodburning stove of FIG. 1A, sectioned along plane 2.

The present invention is a woodburning heating and cooking stove that provides for the efficient, controlled burning of the wood fuel. In FIGS. 1A, 1B and 1C is illustrated a woodburning stove 10 of the present invention. The exterior frame 11 of stove 10 is of typical metal construction for woodburning stoves. At the front of stove 10 is a door 12 which opens into the woodbox area 30. Below door 12 is a second door 13 which opens into ash box area 40. An exhaust duct 14 leads from the stove 10 at the top rear portion of the stove. At the top of stove 10 is a flat, horizontal, cooking surface 15.

At the lower central portion of the interior of stove 10 is located grate 16 upon which wood may be placed for burning. Grate 16 is located directly above ash box area 40. Towards the sides of stove 10, grate 16 has inclined portions 16a which are upwardly directing as they extend towards the respective sides of stove 10. Incline portions 16a are attached to the exterior frame 11 of stove 10, thereby holding grate 16 in a fixed position within the stove.

A secondary combustion chamber 50 is located directly above the central portion of grate 16. Secondary combustion chamber 50 is horizontally elongated, extending nearly the length of stove 10 from front to back. Secondary combustion chamber 50 is defined by fire brick wall 17 which is supported from plate 18 and extends downwardly therefrom. Plate 18 is positioned near the top portion of stove 10 and extends across the width of the stove. Plate 18 has three apertures 18a, 18b, and 18c. Apertures 18a and 18b connect woodbox area 30 with heat transfer area 60, and are covered by movable plates 19a and 19b respectively. Aperture 18c connects heat transfer area 60 with secondary combustion chamber 50.

Sliding plates 19a and 19b are attached to rods 25a and 25b respectively, which each extend to the front exterior of the stove 10. By manually moving knobs 21a and 21b, the opening and closing of apertures 18a and 18b respectively can be controlled.

To the exterior of secondary combustion chamber 50, and also supported by and extending downwardly from horizontal plate 18 is wall 21. In combination, the exterior of secondary combustion chamber 50 and wall 21 define a secondary air chamber 70. At the bottom of wall 21 is attached directing plate 22. Directing plate 22 has an inlet aperture 23a which connects woodbox area 30 with secondary combustion chamber 50. Directing plate 22, in combination with fire brick wall 17 also define apertures 23b and 23c which connect secondary combustion chamber 50 with secondary air chamber 70. Directing plate 22 has a nozzle shape, such that the inlet passageway 24a between woodbox area 30 and secondary combustion chamber 50 narrows as it extends towards aperture 23a. Inlet passageways 24b and 24c also narrow as they extend towards secondary combustion chamber 50. Such narrowing is preferred to accelerate gas flow and aid secondary combustion. In the exemplary embodiment the narrowest point of such passageways does not exceed two inches in width.

In operation, entrance of air into stove 10 is through primary air duct 31 and secondary air duct 32. Air ducts 31 and 32 have butterfly valves 31a and 32a, respectively, to control the rate of airflow into stove 10. These ducts communicate directly with the outside of the building B in which woodburning stove 10 is located. Primary air duct 31 leads into primary air chamber 80. Apertures 33a and 33b allow fresh air to flow directly beneath grate 16 from the primary air chamber 80. During combustion, the fresh air rises through grate 16 and into primary combustion area 20 where it mixes with burning wood. Exhaust from the fire leaves the primary combustion area 20 through passageway 24a, and enters into secondary combustion chamber 50.

Secondary air enters secondary air chamber 70 through secondary air duct 32. In secondary air chamber 70, secondary air is heated by the heat of the fire in the wood combustion area 30. Secondary air is then drawn through passageways 24b and 24c and into secondary combustion chamber 50 by the draft of the rising exhaust air flowing through secondary combustion chamber 50 from the primary combustion area 20.

In secondary combustion chamber 50 the oxygen deficient exhaust gases, which have left the primary combustion area 20, contain partially combusted fuel particles. These gases mix with the fresh, superheated secondary air, which has entered the secondary combustion chamber 50 from the secondary air chamber 70, resulting in a recombustion of the particles. The mixed, recombusted air then rises into the heat transfer area 60 where the heat content of the air is transferred to cooking surface 15. The exhaust gases leave stove 10 by passing through apertures 35a and 35b into exhaust collector 90 which leads to exhaust duct 14.

Figure 2A:
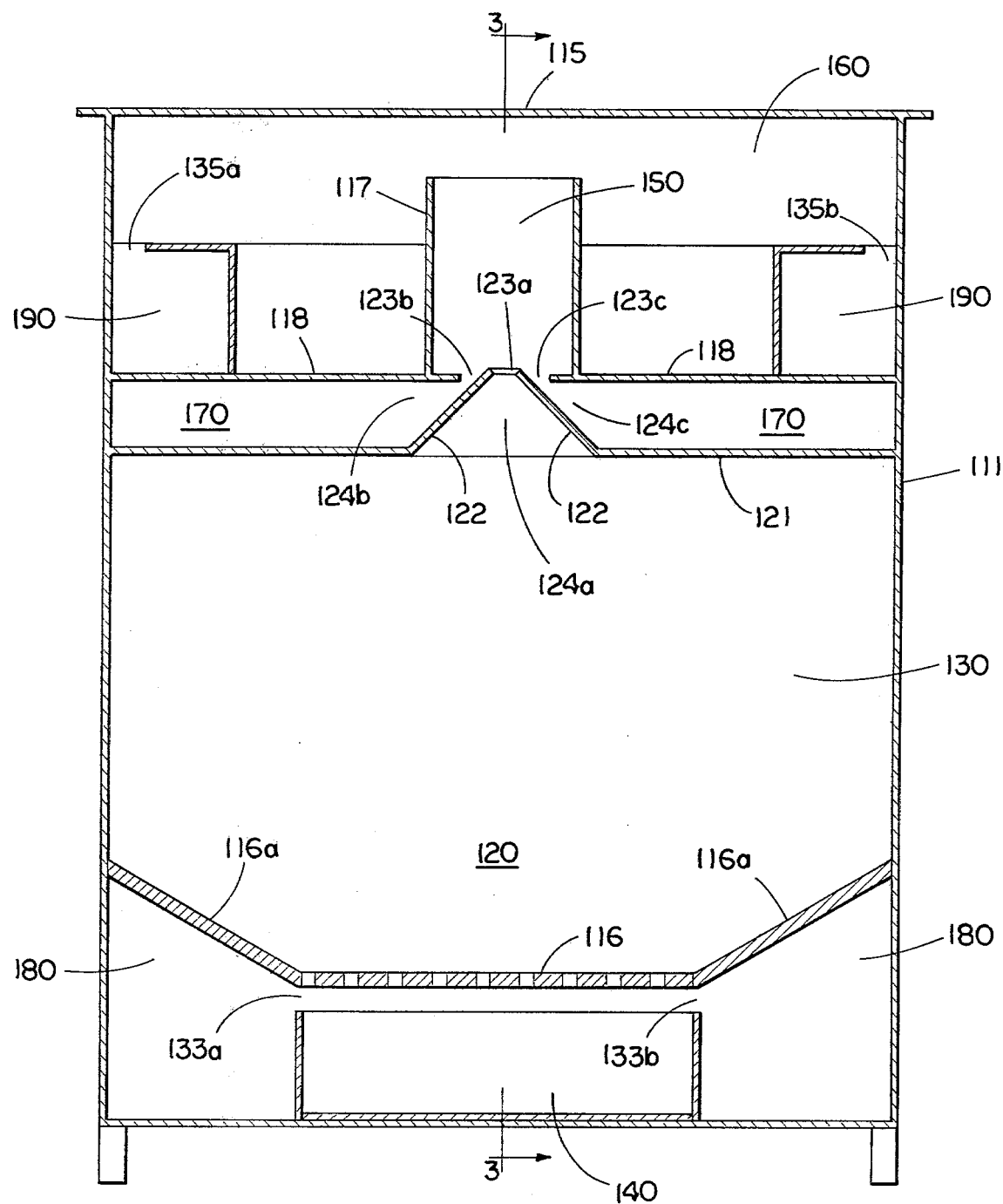
FIG. 2A is a front elevation sectional view of a second woodburning stove of the present invention.
Figure 2B:
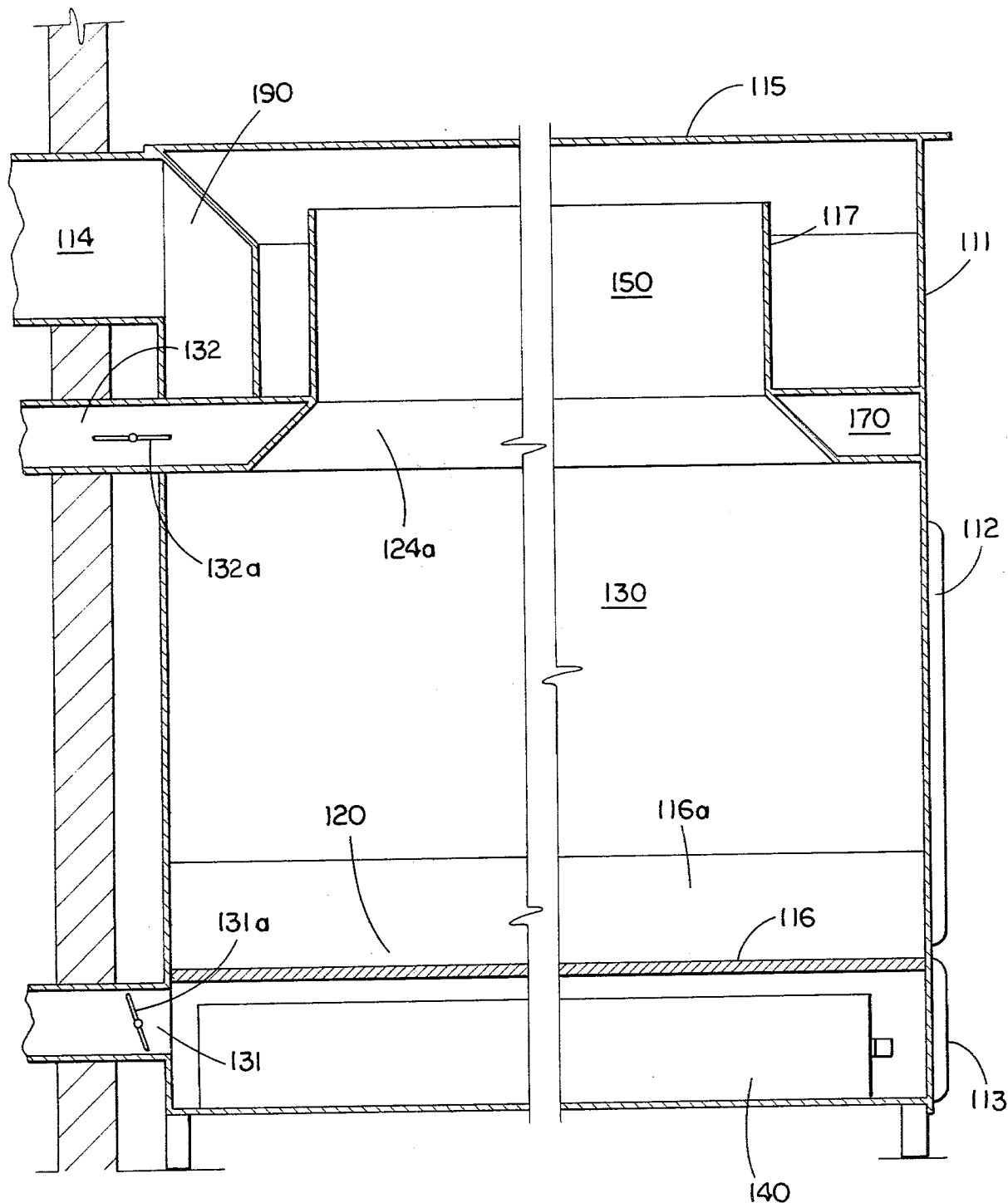
FIG. 2B is a side elevation sectional view of the woodburning stove of FIG. 2A along plane 3.

FIGS. 2A and 2B illustrate another embodiment of the present invention which has the advantages of simplicity of construction and ease of access into the woodburning area. In the woodburning stove of FIGS. 2A and 2B, secondary combustion chamber 150 extends upwardly from horizontal plate 118 rather than downwardly as in the woodburning stove of FIGS. 1A, 1B and 1C. Also, secondary air chamber 170 is defined by the combination of horizontal plate 118, exterior frame 111 and a second horizontal plate 121, which is parallel to and disposed downwardly from plate 118. Directing plate 122 is attached to plate 121. Directing plate 122 defines passageway 124a which leads from wood box area 130 to secondary combustion chamber 150. Passageway 124a narrows as it extends to aperture 123a, and thus has a nozzle like appearance. Directing plate 122, in combination with plate 118 also defines apertures 123b and 123c which connect secondary combustion chamber 150 with secondary air chamber 170. Inlet passageways 124b and 124c also narrow as they extend toward apertures 123b and 123c respectively.

In other respects, the woodburning stove of FIGS. 2A and 2B have a similar structure to the stove of FIGS. 1A, 1B, and 1C. In that regard, exterior frame 111, doors 112 and 113, exhaust duct 114, cooking surface 115, grate and grate incline portion 116 and 116a, secondary combustion chamber wall 117, horizontal plate 118, primary combustion area 120, woodbox area 130, primary air duct 131 and butterfly valve 131a, secondary air duct 132 and butterfly valve 132a, apertures 133a and b, apertures 135a and b, ash box area 140, secondary combustion chamber 150, heat transfer area 160, secondary air chamber 170, primary air chamber 180, and exhaust collector 190, all are structured similarly to and function in a similar manner as their corresponding portions in the woodburning stove of FIGS. 1A, 1B, and 1C.

Figure 3C:
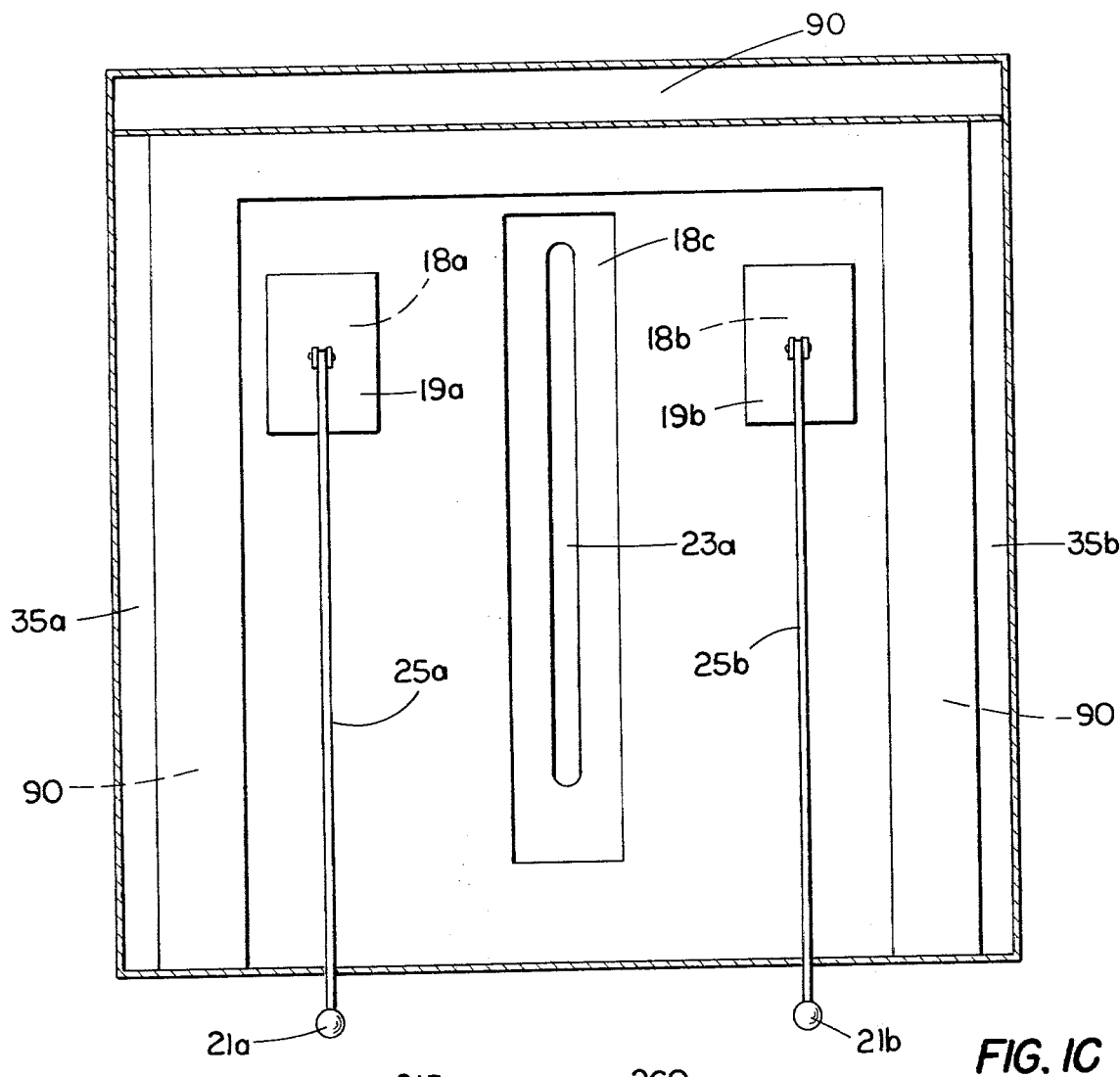
FIG. 3C is a side elevation fragmentary view of the woodburning stove of FIGS. 3A and 3B.
Figure 3C:
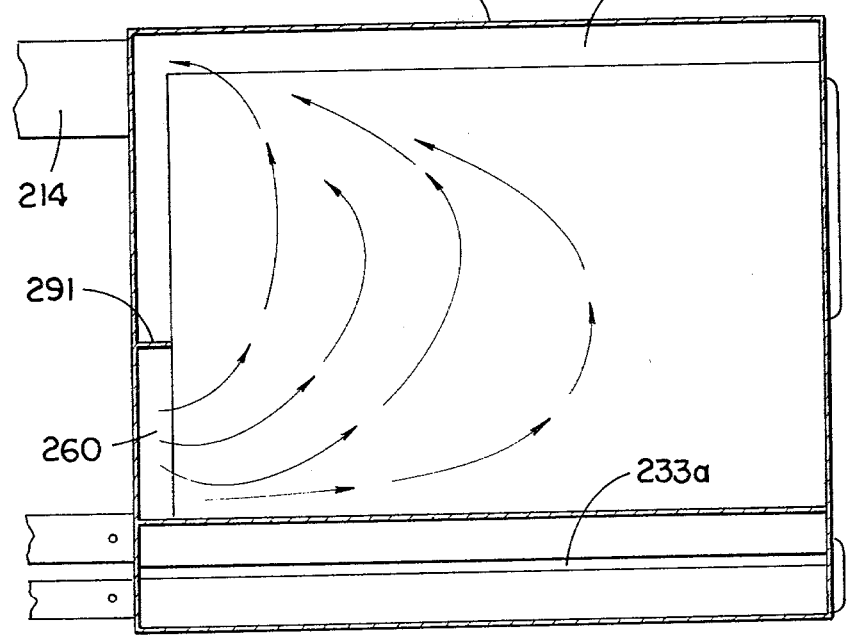
Figure 3A:
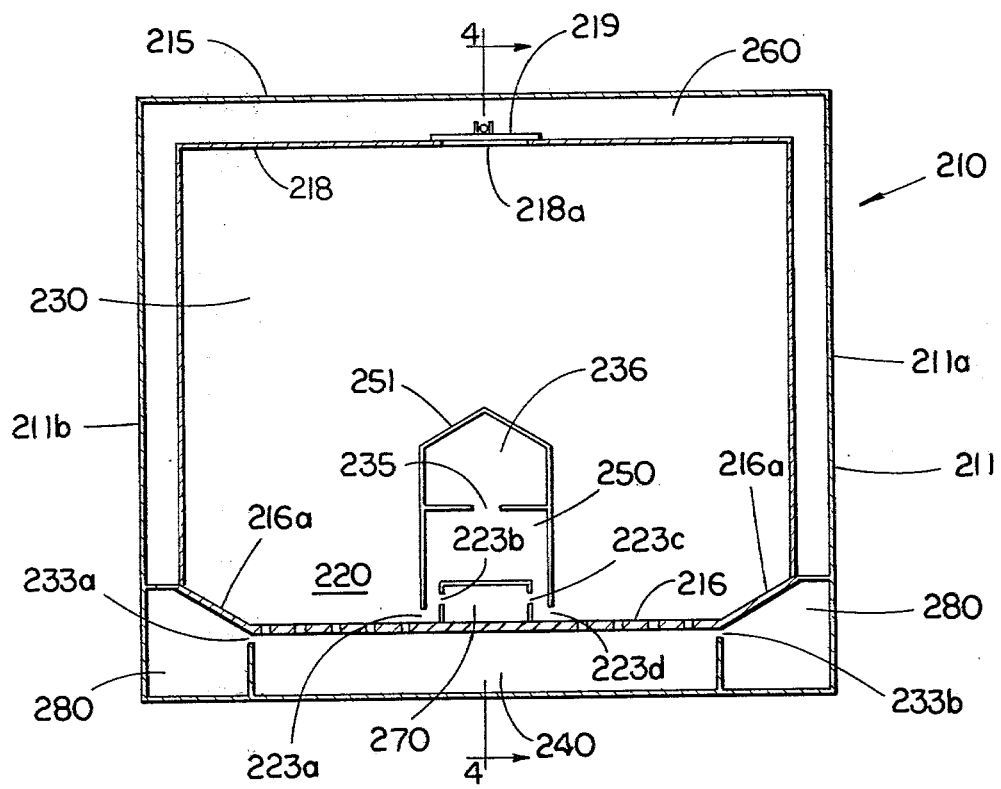
FIG. 3A is a front elevation sectional view of a third woodburning stove of the present invention.
Figure 3B:
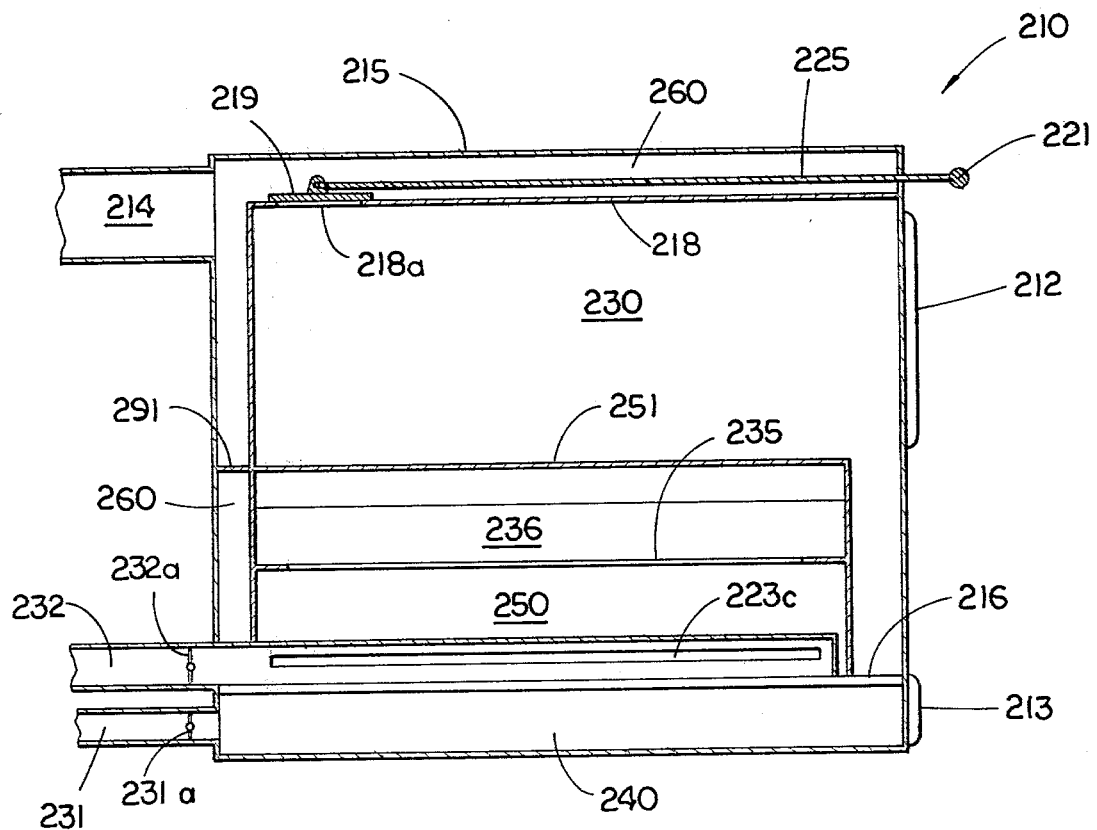
FIG. 3B is a side elevation sectional view of the woodburning stove of FIG. 3A along plane 4.

FIGS. 3A, 3B, and 3C illustrate yet another embodiment of the present invention. In the embodiment so illustrated in FIGS. 3A, 3B, and 3C, the secondary combustion chamber 250 of stove 210 is located near to, and supported from grate 216. By so locating the secondary combustion chamber 250 and secondary air chamber 270 in proximity with the primary combustion area 220, this embodiment of the present invention presents a particular advantage in that the air in these chambers is heated to a very high temperature and therefore produces extremely efficient secondary combustion. Exhaust housing 251 is located on the central portion of grate 216 and extends nearly the length of stove 210 from front to back. Located within housing 251 are the secondary air chamber 270, secondary combustion chamber 250, and exhaust chamber 236. Air flows into secondary combustion chamber 250 from primary combustion area 220 through apertures 223a and 223d. Air flows into secondary combustion chamber 250 from secondary air chamber 270 through apertures 223b and 223c. Exhaust gas leaves secondary combustion chamber 250 and enters exhaust chamber 236 through aperture 235.

Exhaust chamber 236 leads the exhaust gases in a horizontal direction and into heat transfer area 260 at the back portion of stove 210. Baffle plate 291 deflects the direction of the exhaust gas flow to the side portions 211a and 211b of stove 210 where the gases sweep in a generally arcical upward direction in heat exchange chamber 260 and leave the stove through exhaust duct 214.

In other respects, the woodburning stove of FIGS. 3A and 3B have a similar structure to the stove of FIGS. 1A, 1B, and 1C. In that regard, exterior frame 211, doors 212 and 213, exhaust duct 214, cooking surface 215, grate and grate incline portion 216 and 216a, horizontal plate 218, aperture 218a, sliding plate 219, rod 225, knob 221, primary combustion area 220, apertures 223a–d, woodbox area 230, primary air duct 231 and butterfly valve 231a, secondary air duct 232 and butterfly valve 232a, apertures 233a and b, ash box area 240, secondary combustion chamber 250, heat transfer area 260, secondary air chamber 270, and primary air chamber 280, all are structured similarly to and function in a similar manner as their corresponding portions in the woodburning stove of FIGS. 1A, 1B, and 1C.

The present invention provides a woodburning stove that is highly efficient. Because of the secondary combustion which occurs in the secondary combustion chamber, a high percentage of the heat content of the wood fuel can be consumed and applied to the heating and cooking surfaces. This means added convenience to the user of the stove, as the fire needs to be tended less frequently, and also results in a clean burning fire that is not air polluting.

Because the air supply through both the primary air duct and the secondary air duct can be controlled, the rate of burning and the rate of secondary combustion can be independently selected. Therefore the user of the present invention has accurate control of the temperature on the heating and cooking surfaces.

There is another convenience to the user of the stove in that different areas of the cooking surface will have varying temperatures. This is because the hot exhaust gases are directed to one area of the cooking surface as they leave the secondary combustion (the central portion of the cooking surface for the embodiments of FIGS. 1A, 1B, and 1C and FIGS. 2A and 2B, and the side portions of the cooking surface for the embodiment of FIGS. 3A, 3B and 3C). Thus, different foods can be cooked at different temperatures at the same time by appropriately positioning the cooking implements on the stove.

The primary and secondary air ducts bring fresh air to the stove directly from outside the building, thus preventing undesirable floor drafts.

Because the grate has inclined portions, a fire in the stove of the present invention feeds itself as it burns and therefore has to be tended less frequently. This feature, combined with the draft pattern in the present invention, which directs the exhaust gases from the fire into the secondary combustion chamber instead of letting them rise past the yet-to-be burned wood provides for an extremely even burning rate.

Sliding plates 19a, 19b, and 21a disclosed in the embodiment of FIGS. 1A–C and FIGS. 3A–C, allow the present invention to function as an ordinary stove when they are in an open position, as they allow rising exhaust fumes to flow directly to the exhaust duct, thus bypassing the secondary combustion chamber. The moving of these sliding plates to an open position also prevents the exhaust gases from coming out through the front of the stove when the front door of the stove is opened to tend the fire.

While there have been described above the principles of this invention, it is to be clearly understood that this description is made only by way of example and not as a limitation as to the scope of the invention.

What is claimed is:
1. In a woodburning stove including:
   (a) a substantially flat, horizontal heating and cooking surface;
   (b) a wood combustion chamber below said heating and cooking surface, said wood combustion chamber including a grate;
   (c) an exhaust duct; and
   (d) door means for inserting unburned wood into said wood combustion area upon said grate, and for removing ashes from said wood combustion area;
   the improvement comprising:
   (e) a primary air inlet duct leading into said wood combustion chamber below said grate;
   (f) a secondary air inlet duct;
   (g) a heat transfer chamber having a top portion which is in communication with said heating and cooking surface, said exhaust duct leading from said heat transfer chamber;
   (h) a secondary combustion chamber having
       (A) an inlet passageway leading from said wood combustion chamber,
       (B) a secondary air inlet passageway leading from said secondary air inlet duct, and
       (C) an outlet passageway leading to said heat transfer chamber; and
   (i) means for providing escape for exhaust fumes through said exhaust duct other than through said secondary combustion chamber.
2. The woodburning stove of claim 1 additionally including
means for providing escape of exhaust fumes through said exhaust duct, other than through said secondary combustion chamber.
3. The woodburning stove of claim 2 wherein said means for providing escape of exhaust fumes includes a door between said wood combustion chamber and said heat transfer chamber, said door being movable between a fully closed position wherein the only path for the passage of air between said wood combustion chamber and said heat transfer chamber within said stove is through said secondary combustion chamber, and an open position in which air may pass directly between said wood combustion chamber and said heat transfer chamber.
4. The woodburning stove of claim 1 additionally comprising means to direct air flow through said heat transfer chamber such that the directed air does not follow the most direct path to said exhaust duct.
5. The woodburning stove of claim 1 in which said inlet passageway is directly above said grate.
6. The woodburning stove of claim 5 in which said inlet passageway is within one foot of said grate.
7. In a woodburning stove including:
   (a) a substantially flat, horizontal heating and cooking surface;
   (b) a wood combustion chamber below said heating and cooking surface, said wood combustion chamber including a grate;
   (c) an exhaust duct; and
   (d) door means for inserting unburned wood into said wood combustion area upon said grate, and for removing ashes from said wood sombution area;
   the improvement comprising:

(e) a primary air inlet duct leading into said wood combustion chamber below said grate;
(f) a secondary air inlet duct;
(g) a heat transfer chamber having a top portion which is in communication with said heating and cooking surface, said exhaust duct leading from said heat transfer chamber;
(h) a secondary combustion chamber having
  (A) an inlet passageway leading from said wood combustion chamber,
  (B) a secondary air inlet passageway leading from said secondary air inlet duct, and
  (C) an outlet passageway leading to said heat transfer chamber; and
(i) partitioning means for partitioning said secondary combustion chamber from said wood combustion chamber and said heat transfer chamber, said partitioning means defining said inlet passageway between said wood combustion chamber and said secondary combustion chamber, said partitioning means further defining said outlet passageway between said secondary combustion chamber and said heat transfer chamber.

* * * * *